United States Patent
Shoji et al.

(10) Patent No.: US 10,912,149 B2
(45) Date of Patent: Feb. 2, 2021

(54) COMMUNICATION DEVICE

(71) Applicant: Hitachi Kokusai Electric Inc., Tokyo (JP)

(72) Inventors: Tomoya Shoji, Kodaira (JP); Tomoya Miura, Kodaira (JP); Nobuyuki Uchikawa, Kodaira (JP)

(73) Assignee: HITACHI KOKUSAI ELECTRIC INC., Tokyo (JP)

( * ) Notice: Subject to any disclaimer, the term of this patent is extended or adjusted under 35 U.S.C. 154(b) by 67 days.

(21) Appl. No.: 16/318,138

(22) PCT Filed: Jul. 22, 2016

(86) PCT No.: PCT/JP2016/071613
§ 371 (c)(1),
(2) Date: Jan. 16, 2019

(87) PCT Pub. No.: WO2018/016079
PCT Pub. Date: Jan. 25, 2018

(65) Prior Publication Data
US 2019/0297670 A1    Sep. 26, 2019

(51) Int. Cl.
*H04W 88/04* (2009.01)
*H04W 76/18* (2018.01)
(Continued)

(52) U.S. Cl.
CPC ............ *H04W 88/04* (2013.01); *H04L 45/72* (2013.01); *H04L 45/74* (2013.01); *H04W 40/30* (2013.01); *H04W 76/18* (2018.02); *H04W 84/18* (2013.01)

(58) Field of Classification Search
CPC ..... H04W 88/04; H04W 40/30; H04W 76/18; H04W 84/18; H04W 40/02; H04L 45/72; H04L 45/74; H04L 45/121
See application file for complete search history.

(56) References Cited

U.S. PATENT DOCUMENTS

2007/0066312 A1* 3/2007 Shomura ............... H04W 40/18
                                                  455/445
2008/0186907 A1   8/2008 Yagyuu et al.
(Continued)

FOREIGN PATENT DOCUMENTS

JP    2015-109493 A    6/2015
WO    2006/059643 A1   6/2006
(Continued)

OTHER PUBLICATIONS

International Search Report of PCT/JP2016/071613 dated Sep. 6, 2016.

*Primary Examiner* — Pao Sinkantarakorn
*Assistant Examiner* — Kabir U Jahangir
(74) *Attorney, Agent, or Firm* — Mattingly & Malur, PC

(57) ABSTRACT

A communication device that is used for ad-hoc network communication or wireless mesh network communication includes a setting interface unit configured to set an IP address of a communication device corresponding to low-delay communication, and an ad-hoc routing control unit. When a request for low-delay communication is provided from the setting interface unit, the ad-hoc routing control unit determines a route matching the IP address of the communication device and determines whether the low-delay communication is possible. The ad-hoc routing control unit sets a control message transmission interval to the maximum interval when the low-delay communication is possible, and sets the control message transmission interval to the minimum interval when the low-delay communication is not possible.

6 Claims, 16 Drawing Sheets

(51) Int. Cl.
*H04L 12/721* (2013.01)
*H04L 12/741* (2013.01)
*H04W 84/18* (2009.01)
*H04W 40/30* (2009.01)

(56) References Cited

U.S. PATENT DOCUMENTS

2008/0298304 A1    12/2008  Yagyu et al.
2015/0334702 A1*  11/2015  Ji ..................... H04W 72/0453
                                                                          370/280

FOREIGN PATENT DOCUMENTS

WO        2007/020941 A1    2/2007
WO        WO-2013073209 A1 *  5/2013  ............ H04W 40/30

* cited by examiner

FIG.3

Hello Message Format

| Stream Length | | StreamSequence | |
|---|---|---|---|
| Msgtype | Invalid time | MsgLength | |
| Originator Address | | | |
| MsgTTL | Hop Count | MsgSequence | |
| Reserve | | Hello Interval | Willingness |
| LinkCode | Reserve | LinkMessageSize | | ← 301
| Neighbor hood node Address#1 | | | |
| Neighbor hood node Address#2 | | | |
| LinkCode | Reserve | LinkMessageSize | | ← 301
| Neighbor hood node Address#1 | | | |
| Neighbor hood node Address#2 | | | |

⋮

: MPR NODE

FIG. 6

TC Message Format

| Stream Length | | StreamSequence |
|---|---|---|
| Msgtype | Invalid time | MsgLength |
| Originator Address | | |
| MsgTTL | Hop Count | MsgSequence |
| ADV Sequence | | Reserve |
| Advertised Neighbor node Address#1 | | |
| Advertised Neighbor node Address#2 | | |

602 points to the MsgTTL/Hop Count/MsgSequence row.
601 points to the Advertised Neighbor node Address#1 row.

HNA Message Format

| Stream Length | | StreamSequence |
|---|---|---|
| Msgtype | Invalid time | MsgLength |
| Originator Address | | |
| MsgTTL | Hop Count | MsgSequence |
| Network Address#1 | | |
| NetMask #1 | | |
| Network Address#2 | | |
| NetMask #2 | | |

SETTING INTERFACE

SETTINGS　[ON]～B03　　　　　　　[OFF]～B04

LOW-DELAY COMMUNICATION ENTRIES

| NUMBER | IP ADDRESS #1 | IP ADDRESS #2 | IP ADDRESS #N-1 | IP ADDRESS #N |
|---|---|---|---|---|
| 1 | 192.168.0.1 | 192.168.0.2 | 192.168.0.3 | 192.168.0.4 |
| 2 | 192.168.0.5 | 192.168.0.6 | | |
| 3 | 192.168.0.1 | | 192.168.0.3 | |
| | | | | |
| | | | | |
| | | | | |

CURRENTLY SELECTED NUMBER: 1　　　　　　　　　[STORE]

| NUMBER | IP ADDRESS | ROUTE STATUS |
|---|---|---|
| 1 | 192.168.0.1 | CREATED |
| 2 | 192.168.0.2 | CREATED |
| 3 | 192.168.0.3 | NOT CREATED |
| 4 | 192.168.0.4 | NOT CREATED |

COMMUNICATION DEVICE

TECHNICAL FIELD

The present disclosure relates to a communication device and is applicable to a communication device that can be used for ad-hoc routing.

BACKGROUND ART

Ad-hoc routing autonomously detects a terminal among mobile terminals, autonomously optimizes a route, and creates an ad-hoc wireless network via wireless communication according to an ad-hoc routing protocol such as the Optimize Link State Routing (OLSR) protocol or the Adhoc Ondemand Distance Vector (AODV).

CITATION LIST

Patent Literature

Patent Literature 1: Japanese Patent Application Laid-Open No. 2015-109493

SUMMARY OF INVENTION

Technical Problem

In the wireless network created according to the ad-hoc routing protocol, when a user requests real-time data communication, exchanging route information to be used to create a network may reduce a service quality of the real-time data communication.

An object of the present disclosure is to provide a communication device that can reduce a reduction in a service quality that is caused by the exchange of route information to be used to create a network when a request for real-time data communication is provided.

Other objects and new features will be apparent from this specification and the accompanying drawings.

Solution to Problem

A representative overview of the present disclosure is simply described below.

Specifically, a communication device to be used for ad-hoc network communication or wireless mesh network communication includes a setting interface unit configured to set an IP address of a communication device corresponding to low-delay communication, and an ad-hoc routing control unit. When a request for low-delay communication is provided from the setting interface unit, the ad-hoc routing control unit determines a route matching the IP address of the communication device and determines whether the low-delay communication is possible. When the low-delay communication is possible, the ad-hoc routing control unit sets a control message transmission interval to the maximum interval. When the low-delay communication is not possible, the ad-hoc routing control unit sets the control message transmission interval to the minimum interval.

Advantageous Effects of Invention

According to the aforementioned communication device, it is possible to reduce a reduction in a service quality that is caused by the exchange of route information to be used to create a network when a request for real-time data communication is provided.

BRIEF DESCRIPTION OF DRAWINGS

FIG. 3 is a diagram describing a Hello message format.

FIG. 6 is a diagram describing a TC message format.

FIG. 8 is a diagram describing an HNA message format.

FIG. 11 is a diagram describing a setting interface.

FIG. 12 is a diagram describing a low-delay communication table.

DESCRIPTION OF EMBODIMENT

Hereinafter, an embodiment, Example, and a comparative example are described using the accompanying drawings. In the following description, however, the same constituent elements are indicated by the same reference symbols, and duplicate descriptions are omitted in some cases.

First, a basic operation in the OLSR protocol is described. The OLSR protocol is one of mesh-type (mesh-type link) routing protocols currently considered by the Mobile Ad hoc NETwork Working Group (MANET WG) of the International Engineering TaskForce (IETF). The OLSR protocol is a proactive routing protocol. In the OLSR protocol, a route is established before communication by exchanging packets (or exchanging control messages), and relay can be quickly started at any time. OLSR packets are transmitted and received using User Datagram Protocol (UDP) port 698. In the OLSR, the packets are used to exchange two control messages that are called Hello and topology control (TC) messages, recognize information in a network, and create a route.

Figure 1:
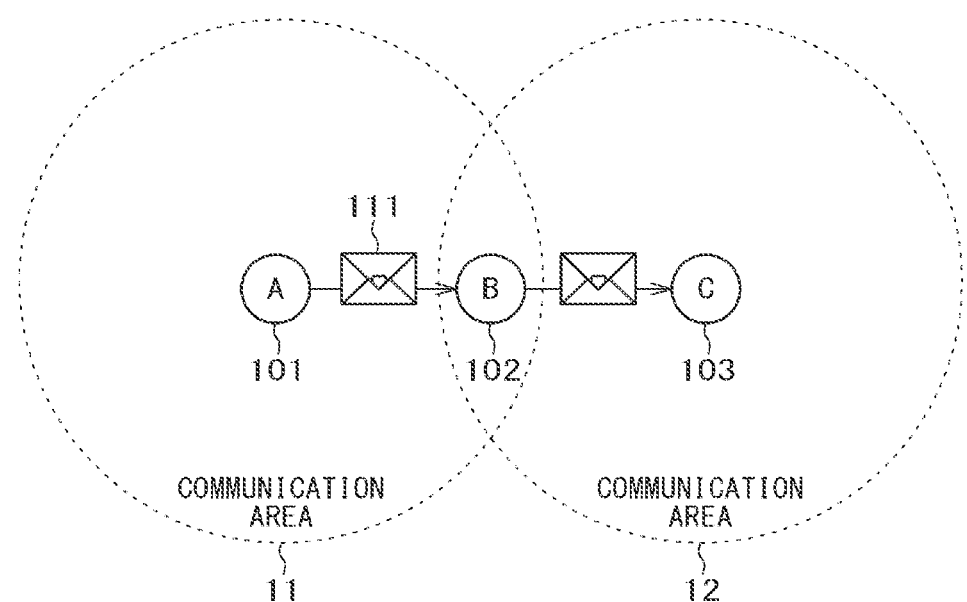
FIG. 1 is a schematic diagram describing the concept of relay in an ad-hoc network.

Next, an overview of relay in an ad-hoc network is described with reference to FIG. 1. FIG. 1 is a schematic diagram showing the concept of the relay in the ad-hoc network. In FIG. 1, a first communication area 11 of an A node 101 and a second communication area 12 of a C node 103 partially overlap each other, and a B node 102 exists in an area in which the first and second communication areas 11 and 12 partially overlap each other. Specifically, the A node 101 and the B node 102 exist in the first communication area 11, while the B node 102 and the C node 103 exist in the second communication area 12. In this case, data 111 output from the A node 101 toward the C node 103 is relayed by the B node 102 and transferred to the C node 103. By using ad-hoc routing in this manner, each of mobile terminals within the wireless network (ad-hoc network) 1 can directly or indirectly wirelessly communicate with the other terminals. In this case, the "nodes" are mobile communication devices (mobile terminals) forming the wireless network.

Figure 2A:
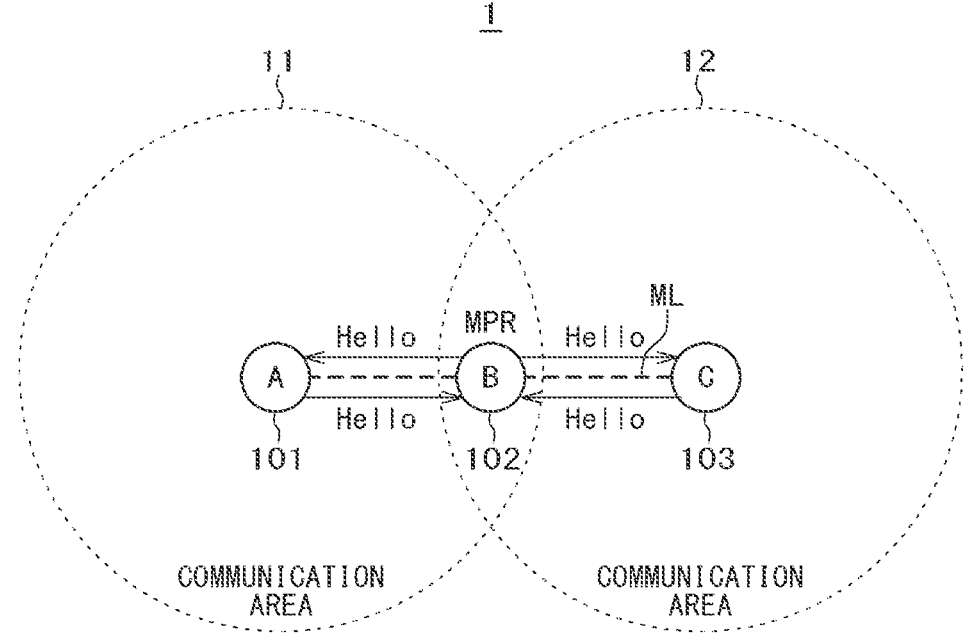
FIG. 2A is a diagram showing the concept of a logical connection based on a Hello message.
Figure 2B:
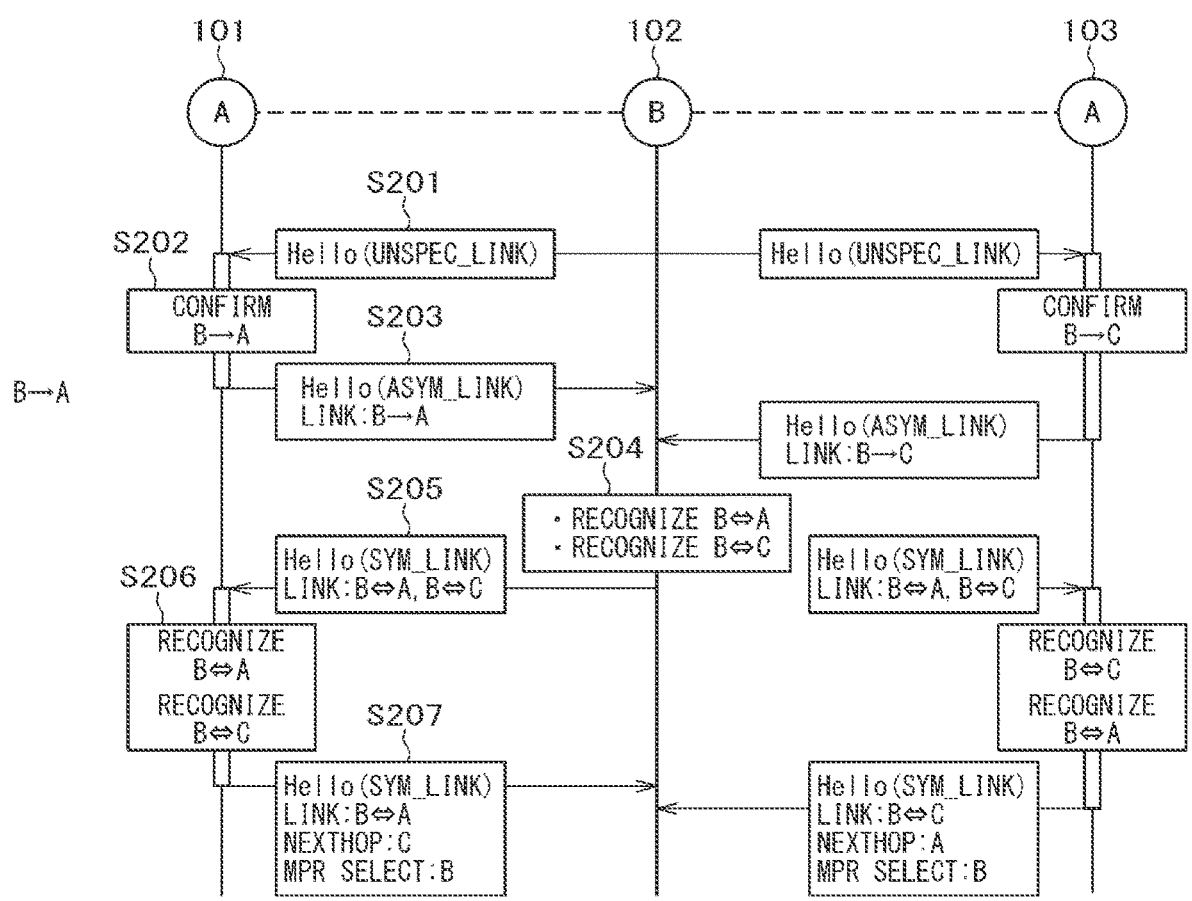
FIG. 2B is a diagram showing an example of a sequence of the logical connection based on the Hello message.

Next, a logical connection based on a Hello message of the OLSR protocol is described with reference to FIGS. 2A, 2B, and 3. FIG. 2A is a diagram showing the concept of the logical connection based on the Hello message. FIG. 2B is a diagram showing an example of a sequence of the logical connection based on the Hello message. FIG. 3 is a diagram describing a Hello message format.

The Hello message is periodically transmitted for the purpose of the delivery of information held in the nodes and is received to collect peripheral information, establish a logical connection (logical link) to a periphery, and determine a relay node called a multipoint relay (MPR).

As shown in FIG. 2, when the B node 102 exists in the area in which the communication area of the A node 101 and the communication area of the C node 103 partially overlap each other, the B node 102 is selected as an MPR by the exchange of the Hello message, and communication can be executed between the A node 101 and the C node 103 by establishing a mesh link (ML).

The sequence of the logical connection is described with reference to FIG. 2B. Although a sequence between the A node 101 and the B node 102 is described below, the same process as described below can be executed between the C node 103 and the B node 102.

The B node 102 sets LinkCode 301 of a Hello message to UNSPEC_LINK (the state of a link is not clear) and transmits the Hello message to the adjacent node (A node 101) in order to notify the existence of the B node 102 at an initial stage (in S201). In LinkCode 301, information of LINK-TYPE indicating the state of the link is stored. The adjacent node (A node 101) receives the Hello message from the B node 102 and recognizes that the link from the source B node 102 to the A node 101 has been created (in S202). The A node 101, however, does not recognize that the link is a bidirectional link. Thus, the A node 101 sets LinkCode 301 to ASYM LINK (unidirectional link) and transmits the Hello message to the adjacent node (B node 102) at the next transmission interval (in S203).

Then, since the node (B node 102) that has received the Hello message from the A node 101 is included in targets for ASYM LINK, the B node 102 recognizes that the Hello message of UNSPEC_Link that has been transmitted by the B node 102 has been received by the adjacent node (A node 101). Since the B node 102 has received the message from the adjacent node (A node 101), the B node 102 recognizes that the bidirectional link has been created (in S204). After that, the B node 102 sets LinkCode 301 to SYM_LINK (bidirectional link) and transmits, to the adjacent node (A node 101), the Hello message indicating that the bidirectional link has been created between the A node 101 and the C node 103 at the next transmission interval (in S205). The node (A node 101) that has received the Hello message recognizes that the bidirectional link to the source has been created and that the next adjacent node (C node 103) exists adjacent to the source (in S206). Then, the A node 101 sets, to NEXTHOP, the next adjacent node (C node 103) of the node (B node 102) that has created the bidirectional link, and transmits the Hello message including LinkCOde 301 set to SYM_LINK (bidirectional link) to the adjacent node (B node 102) at the next transmission interval (in S207).

In this case, since information indicating that one of adjacent nodes is selected as an MPR (relay node) is notified, the A node 101 transmits, to the adjacent node (B node 102), the Hello message including LinkCode 301 set to MPRLINK. This indicates that the A node 101 selects the B node 102 as the MPR.

In this manner, the logical connection is established using the Hello message.

Figure 4A:
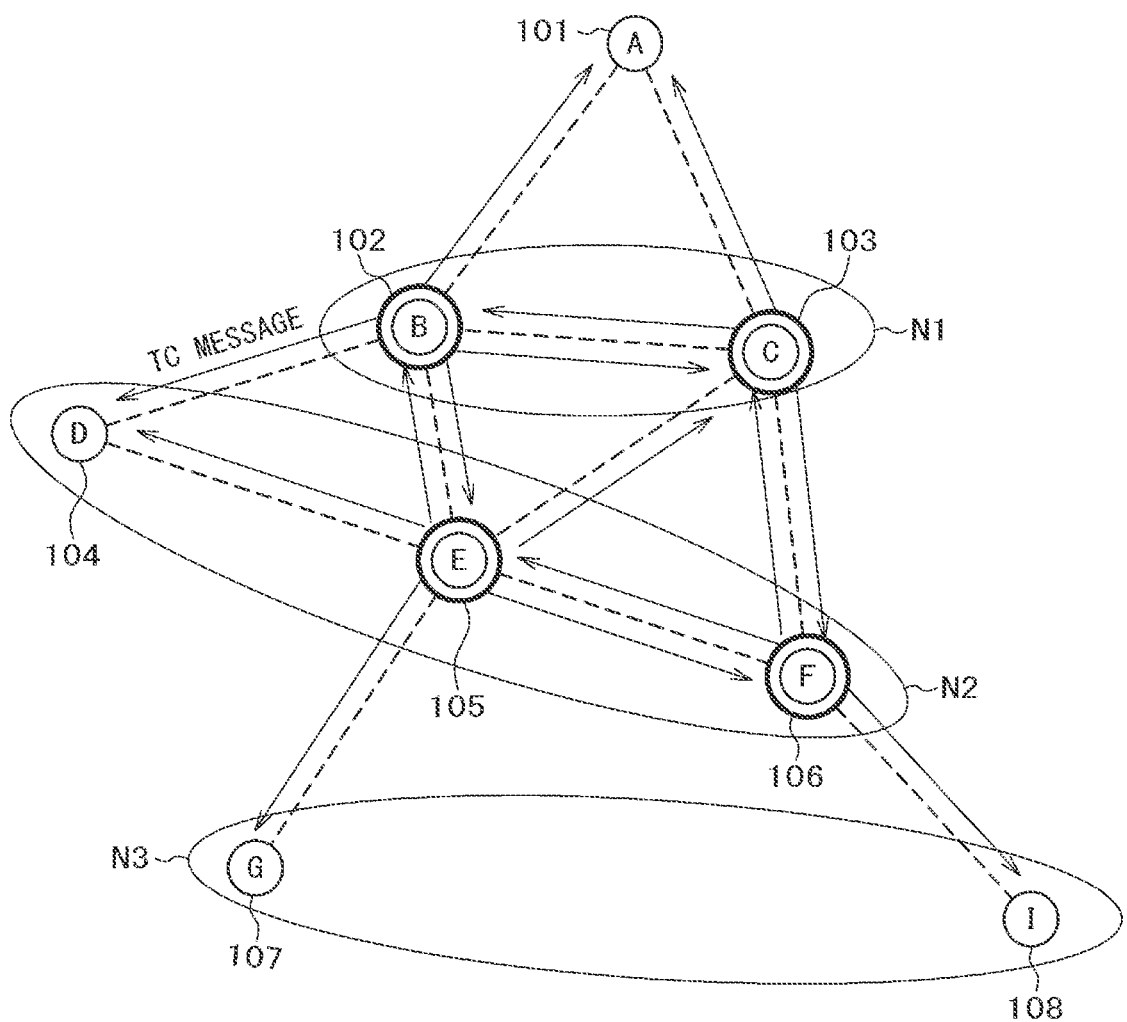
FIG. 4A is a diagram describing the flooding of a TC message.
Figure 4A:
Figure 4B:
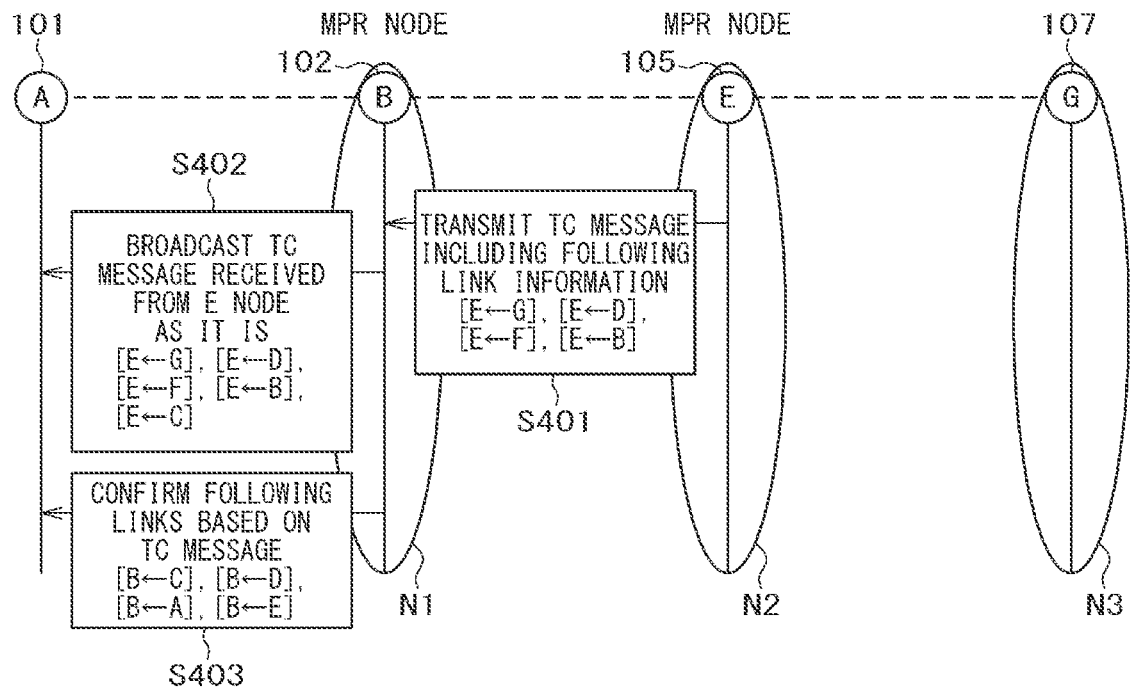
FIG. 4B is a diagram describing the flooding of the TC message.
Figure 4C:
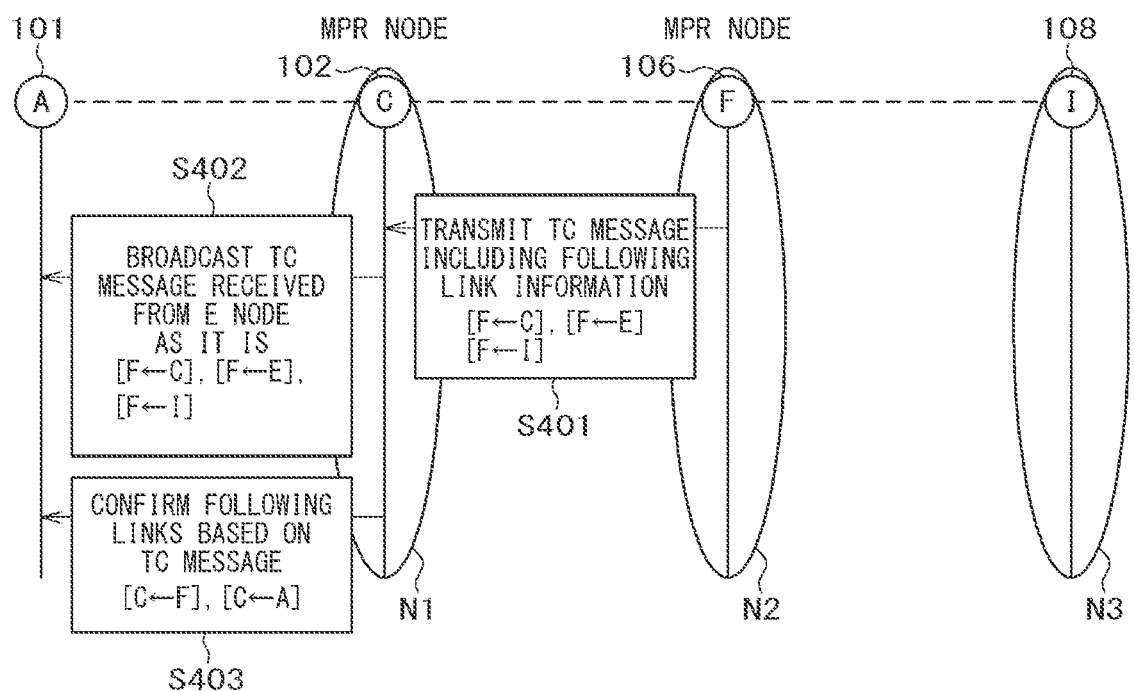
FIG. 4C is a diagram describing the flooding of the TC message.
Figure 5A:
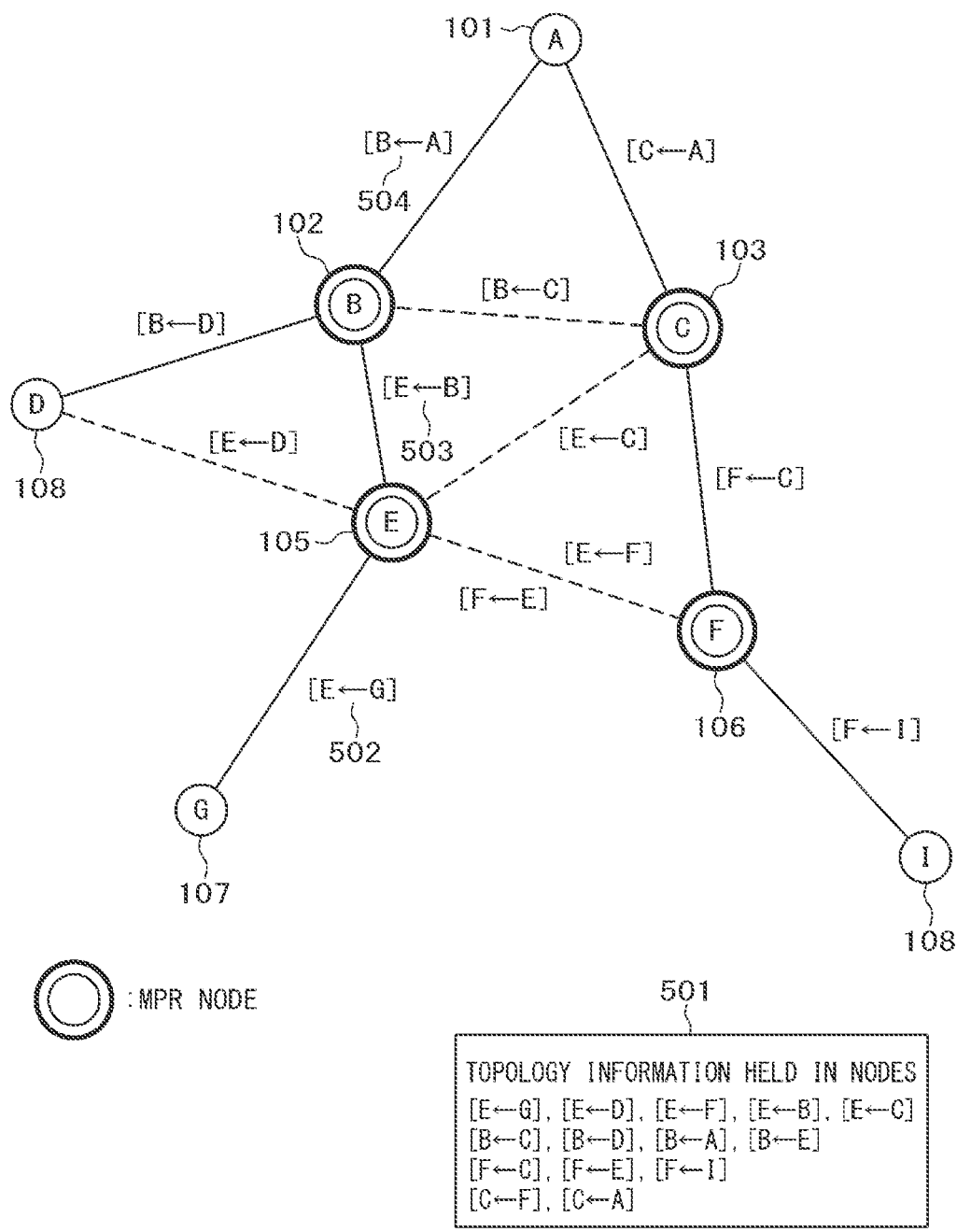
FIG. 5A is a diagram describing route determination based on the TC message.
Figure 5B:
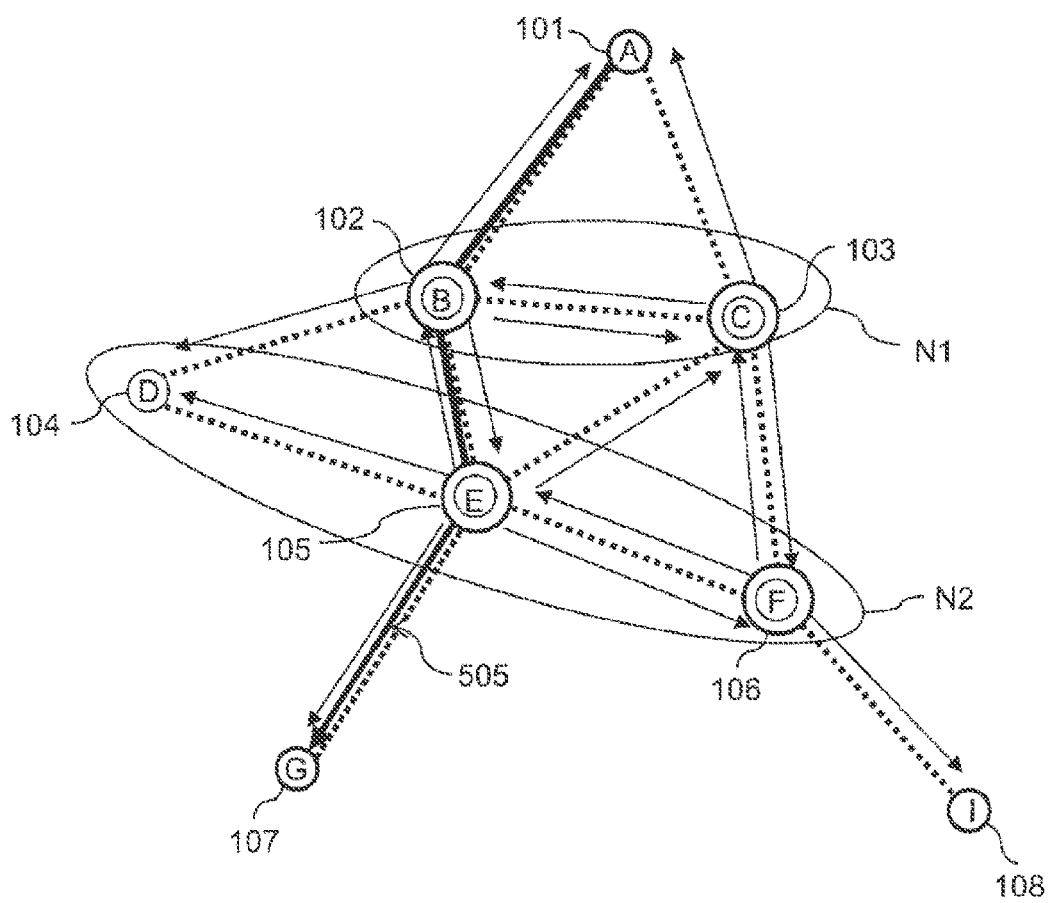
FIG. 5B is a diagram describing the route determination based on the TC message.

An overview of a TC message is described with reference to FIGS. 4A to 6. FIG. 4A is a diagram showing the flooding of the TC message. FIGS. 4B and 4C are diagrams showing a process sequence of the flooding of the TC message. FIG. 5A is a diagram showing a network configuration created based on the TC message. FIG. 5B is a diagram showing a route from the A node to a G node. FIG. 6 is a diagram describing a TC message format.

The TC message is a control message to be transmitted by only a node selected as an MPR and is used to notify the configuration of the entire network. The flooding is the delivery of the same packet from a single node to all nodes or is simultaneous delivery (broadcasting).

As shown in FIG. 6, the TC message includes regions such as MsgTTL (602) for storing a value indicating the life of the message, Advertised Neighbor Node Address #1 (601) for storing an address of an advertised neighbor node, and the like.

An E node 105 selected as an MPR and an F node 106 selected as an MPR are mainly described with reference to FIGS. 4A to 4C. The E node 105 is selected as the MPR by the B node 102, a D node 104, the F node 106, and the G node 107, while the F node 106 is selected as the MPR by the C node 103, the E node 105, and an I node 108. The B node 102 is selected as an MPR by the A node 101, the C node 103, the D node 104, and the E node 105. The C node 103 is selected as an MPR by the A node 101 and the F node 106.

As shown in FIG. 4B, the E node 105 selected as the MPR based on a Hello message broadcasts a TC message indicating the advertised neighbor nodes (G node, D node, F node, B node, and C node) 601 that have selected the E node 105 as the MPR (in S401). Dotted lines shown in FIG. 4A indicate that logical connections (mesh links) are established, and arrows indicate that TC messages are broadcast. The B node 102 (MPR) that has received the TC message from the E node 105 acquires the advertised neighbor nodes (601) indicated in the received TC message and adds the acquired advertised neighbor nodes (601) to network topology information of the B node 102. In this case, since the B node 102 is also the MPR, the B node 102 reduces MsgTTL (valid message interval) 602 of the received TC message by 1 and broadcasts the TC message again (in S402). The B node 102 broadcasts the TC message indicating the advertised neighbor nodes (A node 101, C node 103, D node 104, and E node 105) that have selected the B node 102 as the MPR (in S403). FIG. 4B shows "confirm following links". Since the A node 101 that has received the TC message from the B node 102 is not an MPR, the A node 101 does not broadcast the TC message again, acquires information of neighbor nodes from the received TC message, adds the acquired information to network topology information (information of a topology of the network) of the A node 101, and terminates the process sequence.

These processes are executed on the other MPRs. For example, the processes are executed on the F node 106 in the same manner as the E node 105 as shown in FIG. 4C.

After that, the calculation of the shortest routes to the nodes starts to be executed based on network topology information of the nodes. The A node 101 is mainly described below.

As shown in FIG. 5A, the nodes that have received a TC message hold common network topology information (topology information) 501. As the topology information, link information of [E←G], [E←D], [E←F], [E←B], [E←C], [B←C], [B←D], [B←A], [B←E], [F←C], [F←E], [F←I], [C←F], and [C←A] is held.

Each of the nodes calculates the shortest routes to the other nodes based on the topology information 501. The case where the A node 101 calculates a route to the G node 107 is described below as an example.

The A node 101 extracts, from the topology information 501, link information of a link to the G node 107 and starts the calculation. Since the E node 105 is linked to (or logically connected to) the target G node 107, the A node 101 extracts [E←G] 502 that is information of [E↔G].

Next, the A node 101 extracts information of a node linked to the E node 105. In this case, since the A node 101 selects the B node 102 as the MPR in order to reach the E node 105, the A node 101 extracts [B←E] 503 that is information of [B↔E]. Similarly, the A node 101 extracts [B←A] 504 as information of a link to the B node 102, while [B←A] 504 is information of [B↔A].

Link information necessary for the A node 101 to reach the G node 107 is [G↔E↔B↔A]. Based on this information, the A node 101 sets a route 505 to the G node 107 as shown in FIG. 5B.

In the OLSR, by using two control messages or Hello and TC messages, each of the nodes can freely communicate with all the other nodes participating in the mesh network.

For the OLSR, there is a control message that is called a Host and Network Association (HNA) message. The HNA message is an auxiliary message to be used when a node functions as a gateway. The HNA message can be transmitted by setting information of a wired network in a node serving as the gateway in advance.

Figure 7A:
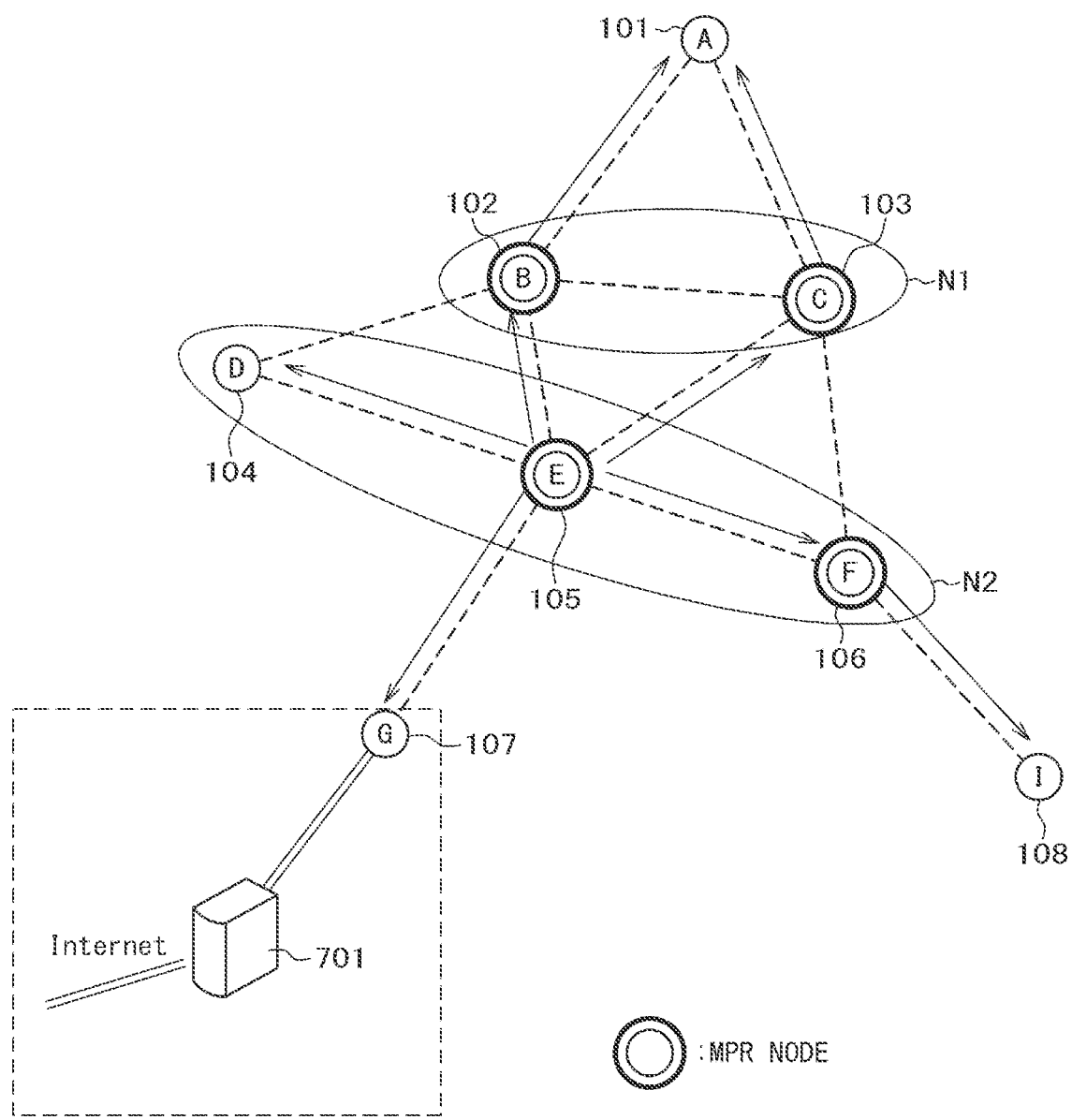
FIG. 7A is a diagram describing a route notification using an HNA message.
Figure 7B:
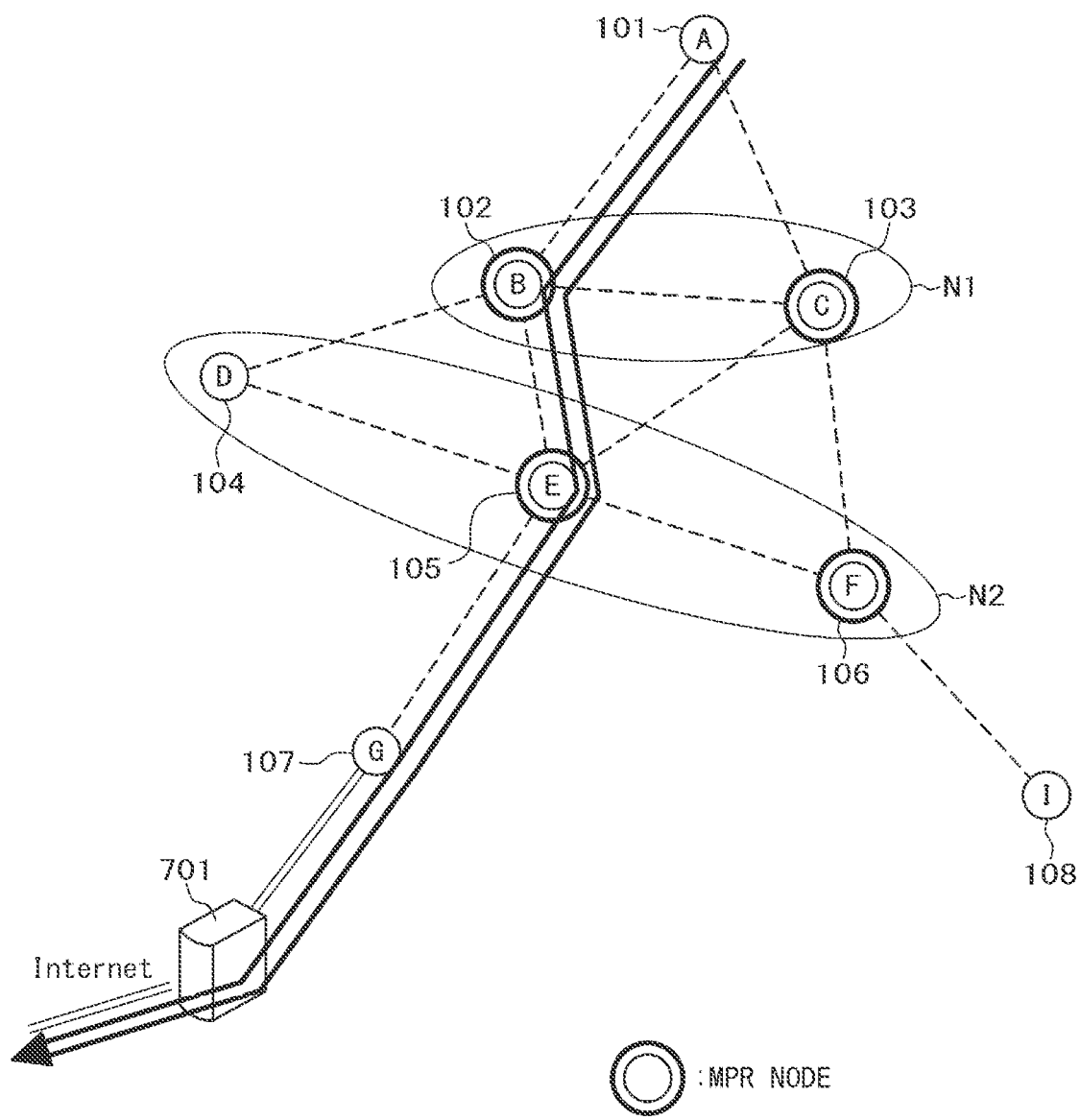
FIG. 7B is a diagram describing an Internet connection established in accordance with the notification using the HNA message.

A route notification using the HNA message is described with reference to FIGS. 7A, 7B, and 8. FIG. 7A is a diagram showing the state of the route notification using the HNA message. FIG. 7B is a diagram showing a state in which the Internet is connected in accordance with the notification using the HNA message. In addition, FIG. 8 is a diagram showing an HNA message format.

Flooding that is the same as or similar to a TC message is used for the transmission of the HNA message. Specifically, the HNA message shown in FIG. 8 is broadcast by an MPR in the same manner as the TC message. An MPR that has received the HNA message broadcasts the HNA message again, and the HNA message is notified to all mobile terminals within the wireless network.

FIGS. 7A and 7B show an example in which an Internet gateway 701 is connected to the G node 107. The G node 107 has, registered therein, an address of the Internet gateway 701. The G node 107 uses the HNA message to notify that the gateway 701 is connected to the G node 107. The E node 105 (MPR) that has received the HNA message from the G node 107 broadcasts the HNA message to the B node 102, the C node 103, the D node 104, and the F node 106 in the same manner as the TC message. The other MPR nodes (E node 105, B node 102, C node 103, and F node 106) broadcast the HNA message in the same manner so that the existence of the gateway can be notified to all the mobile terminals within the wireless network.

Thus, the A node 101 can be connected to the Internet via the B node 102, the E node 105, and the G node 107, for example.

Figure 10:
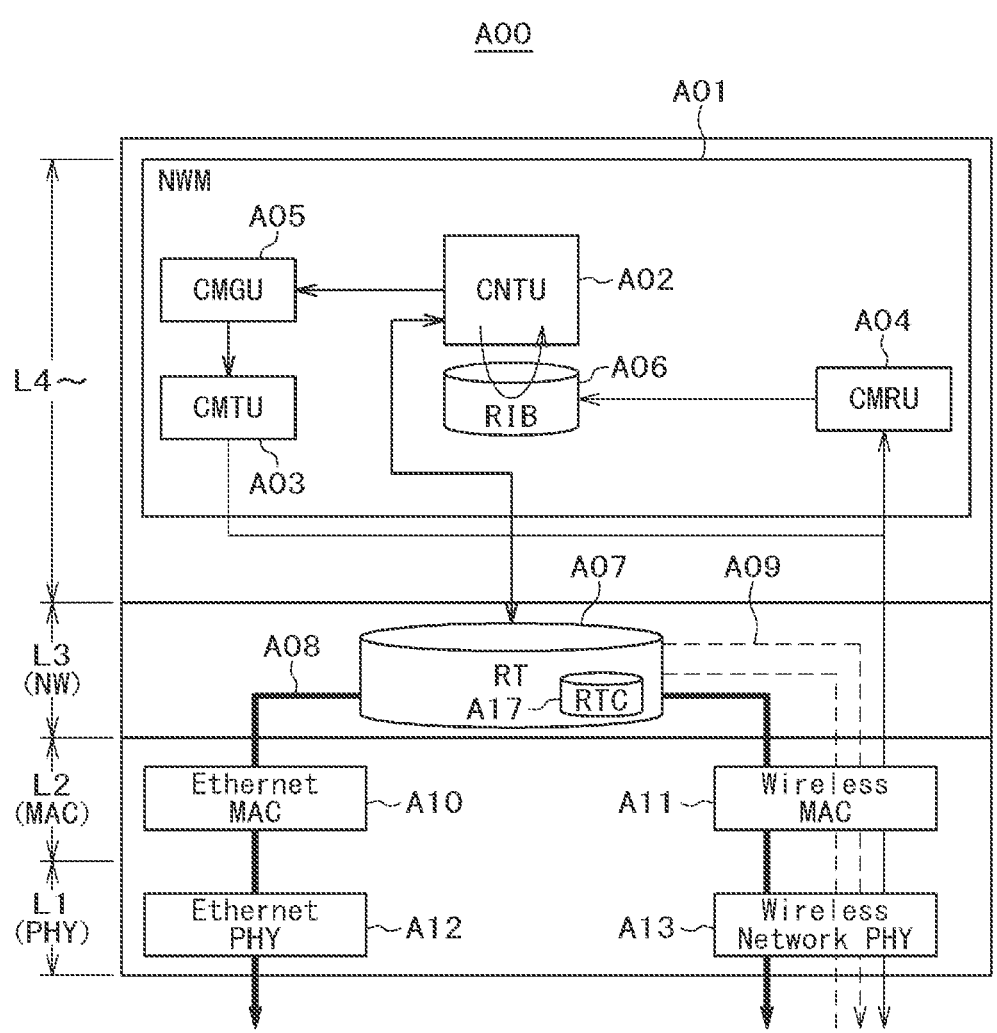
FIG. 10 is a diagram describing a system configuration of a communication device according to a comparative example.

Next, a configuration of a communication device according to a comparative example and the relay of a control message are described with reference to FIG. 10. FIG. 10 is a system configuration diagram showing the configuration of the communication device according to the comparative example. FIG. 10 shows the system configuration of the communication device configured to relay between a wired autonomous network and a wireless autonomous network (ad-hoc network or the like).

As shown in FIG. 10, in the communication device A00 according to the comparative example, a network module (NWM) A01 that enables an ad-hoc routing protocol (wireless network routing protocol) is deployed in layers including and higher than the transport layer or Layer 4 (L4), and a routing table (RT) A07 is deployed in the network (NW) layer or Layer 3 (L3), a wired network MAC layer (Ethernet MAC) A10 and a wireless network MAC layer (wireless MAC) A11 are deployed in the medium access control (MAC) layer or Layer 2 (L2), and a wired network PHY layer (Ethernet PHY) A12 and a wireless network PHY layer (Wireless Network PHY) A13 are deployed in the physical (PHY) layer or Layer 1 (L1).

In the network module (NWM) A01, an ad-hoc routing control unit (CNTU) A02, a control message transmission unit (CMTU) A03, a control message reception unit (CMRU) A04, a control message generation unit (CMGU) A05, and a routing information base (RIB) A06 are deployed.

In the communication device A00, a control message received by the control message reception unit A04 is analyzed by the ad-hoc routing control unit A02 and stored in the routing information base A06.

After that, the ad-hoc routing control unit A02 extracts information from the routing information base A06 at control message transmission intervals set in advance and gives the extracted information to the control message generation unit A05. A control message generated by the control message generation unit A05 is given to the control message transmission unit A03 and transmitted to the lower-level layer.

In addition, the ad-hoc routing control unit A02 registers a communication route in a routing table A07 based on the information stored in the routing information base A06.

To register the route, a destination IP address, a network identification flag (netmask), an IP address of a relay node (gateway), a metric of the route, information of an output interface (Ethernet PHY (A12) or wireless network PHY (A13)), and the like are required.

The set route is used to select the output interface.

When an IP packet is input from the side of a wired autonomous network interface A08 (Ethernet MAC (A10), Ethernet PHY (A12)), the communication device A00 confirms a communication route registered in the routing table A07 of the communication device A00. After that, when the communication route registered in the routing table A07 of the communication device A00 and matching a destination IP address of the IP packet exists, the communication device A00 outputs the IP packet to the output interface set upon the registration.

The routing table A07 also acts for an IP packet from the side of a wireless autonomous network interface A09 (wireless network MAC (A11), wireless network PHY (A13)) in the same manner.

In this case, an output destination of a route registered in the routing table A07 may be the wired autonomous network interface or may be the wireless autonomous network interface.

In addition, the communication device A00 includes a function of storing information of a route matching input data in a temporal storage region (routing table cache (RTC)) A17.

In the communication device according to the comparative example, the wireless network can be created according to an ad-hoc routing protocol. However, in the wireless network, when a user requests real-time data communication, exchanging route information to be used to create a network may reduce a service quality of the real-time data communication.

When the communication device according to the embodiment determines that a request for real-time data communication is provided, the communication device according to the embodiment reduces the frequency of the exchange of route information between the communication device and another communication device, reduces line utilization for the route information, and guarantees a service quality of the real-time data communication.

Specifically, the communication device according to the embodiment includes the following functions.
(A) A function of setting an IP address of a communication device corresponding to real-time communication (low-delay communication)
(B) A function of determining a route matching the IP address of the communication device and determining whether the low-delay communication is possible when a request for the low-delay (real-time) communication is provided
(C) A function of setting control message transmission intervals to the maximum interval when the low-delay communication is possible and setting the control message transmission intervals to the minimum interval when the low-delay communication is not possible The communication device according to the embodiment creates a network route based on received information upon the creation of a wireless ad-hoc network or a wireless mesh network. Details are as follows.
(1) In a wireless (communication) system composed of multiple wireless devices (communication devices) and configured to execute communication via one or more wireless devices (communication devices), when a request for low-delay communication is provided, the wireless devices (communication devices) control frequencies of the exchange of route control information according to the ad-hoc routing protocol, control exchange intervals, and control traffic amounts.
(2) The communication devices described in (1) controls the frequencies of the exchange of the route control information according to the ad-hoc routing protocol again and controls the exchange intervals again when a route is not created.
(3) The communication devices described in (2) controls the frequencies of the exchange of the route control information according to the ad-hoc routing protocol and controls the exchange intervals until the communication devices described in (2) becomes able to communicate with an arbitrary communication device so that the frequencies of the exchange are set to the lowest frequency and the exchange intervals are set to the minimum interval.

EXAMPLE

Figure 9:
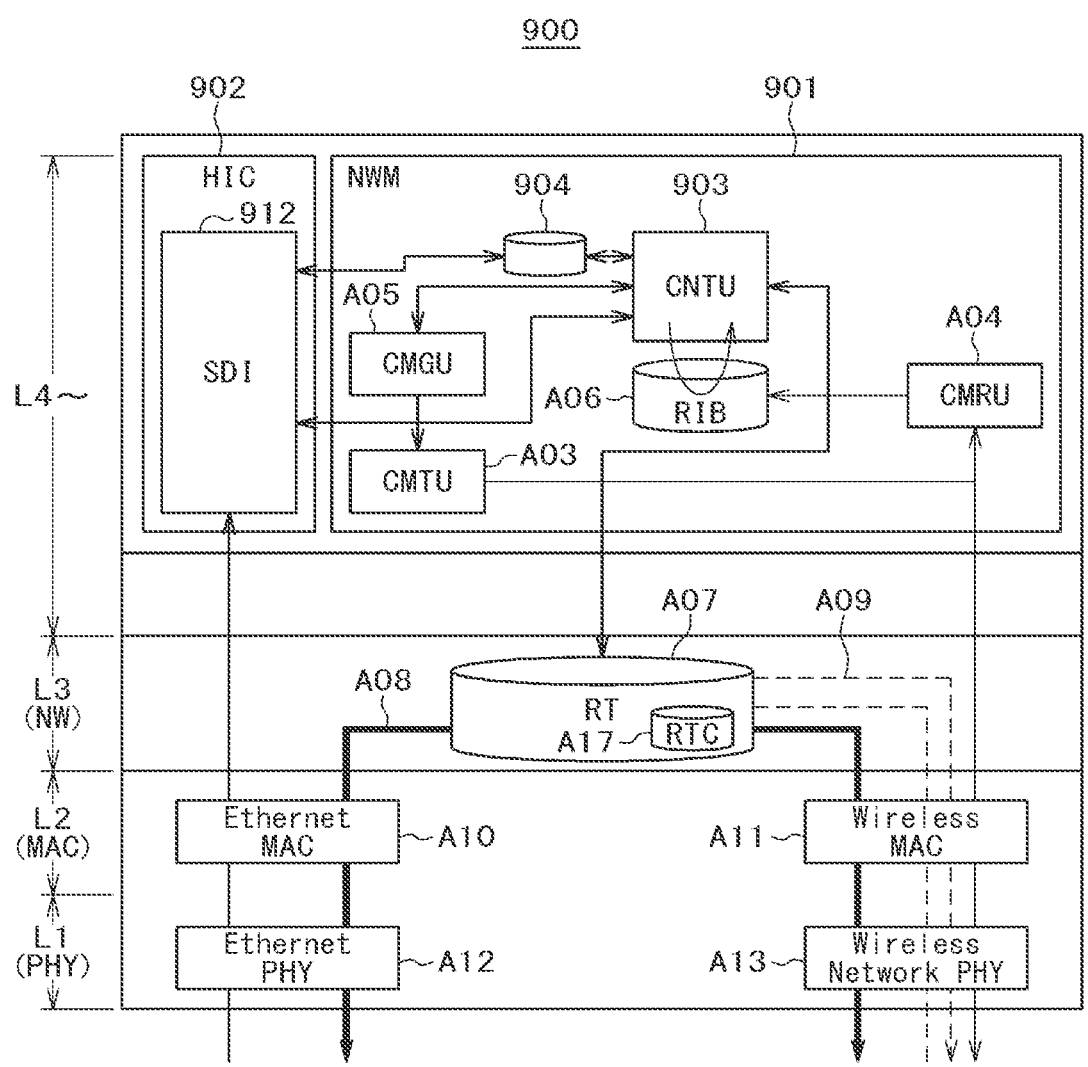
FIG. 9 is a diagram describing a system configuration of a communication device according to Example.

A configuration of a communication device according to Example is described with reference to FIG. 9. FIG. 9 is a system configuration diagram showing the configuration of the communication device according to Example.

The communication device 900 according to Example has the same configuration as the communication device A00 according to the comparative example in the layers including and lower than the network layer and includes a network module (NWM) 901 and a human interface controller (HIC) 902 including a setting/display interface (SDI) 912 in the transport layer. The network module (NWM) 901 is obtained by adding a low-delay communication table 904 to the network module (NWM) A01 of the comparative example.

In the communication device 900, a control message received by a control message reception unit A04 is analyzed by an ad-hoc routing control unit (CNTU) 903 and stored in a routing information base A06.

After that, the ad-hoc routing control unit 903 extracts information from the routing information base A06 at control message transmission intervals set in advance and gives the extracted information to a control message generation unit A05. A control message generated by the control message generation unit A05 is given to a control message transmission unit A03 and transmitted to the lower-level layer.

In addition, the ad-hoc routing control unit 903 registers a communication route in a routing table A07 based on information stored in the routing information base A06.

A setting interface is described with reference to FIGS. 11 and 12. FIG. 11 is a diagram describing the setting interface. FIG. 12 is a diagram describing the low-delay communication table.

A network administrator or the like sets, based on a setting interface screen shown in FIG. 11, multiple IP addresses of communication devices corresponding to low-delay (real-time) communication for numbers and generates a combination (B01). Multiple combinations can be generated and stored. Specifically, the setting interface is a table-type input screen. An IP address #1, an IP address #2, an IP address #N−1, and an IP address #N are input and stored by clicking a storage button B02. For example, IP addresses for low-delay communication of a number 1 are 192.168.0.1, 192.168.0.2, 192.168.0.3, and 192.168.0.4. The aforementioned set details are input as a table in a format shown in FIG. 12 to the low-delay communication table 904 from the setting/display interface (SDI) 902. When one of the combinations is selected and an ON button B03 clicked, the communication device is operated. The combinations may not be selected and not be set or may be invalid. In this case, an OFF button B04 is clicked. A currently selected combination can be displayed (B05).

Next, an example of a configuration of the low-delay communication table is described with reference to FIG. 12. The low-delay communication table stores route creation statuses and stores, as indices, IP addresses of terminals corresponding to the combinations set by the aforementioned setting interface unit 912. Each of the route creation statuses stores "created" when a route is created by the ad-hoc routing control unit 903, like the communication device A00 according to the comparative example. Each of the route creation statuses stores "not created" when a route is not created, like the communication device A00 according to the comparative example.

Figure 13A:
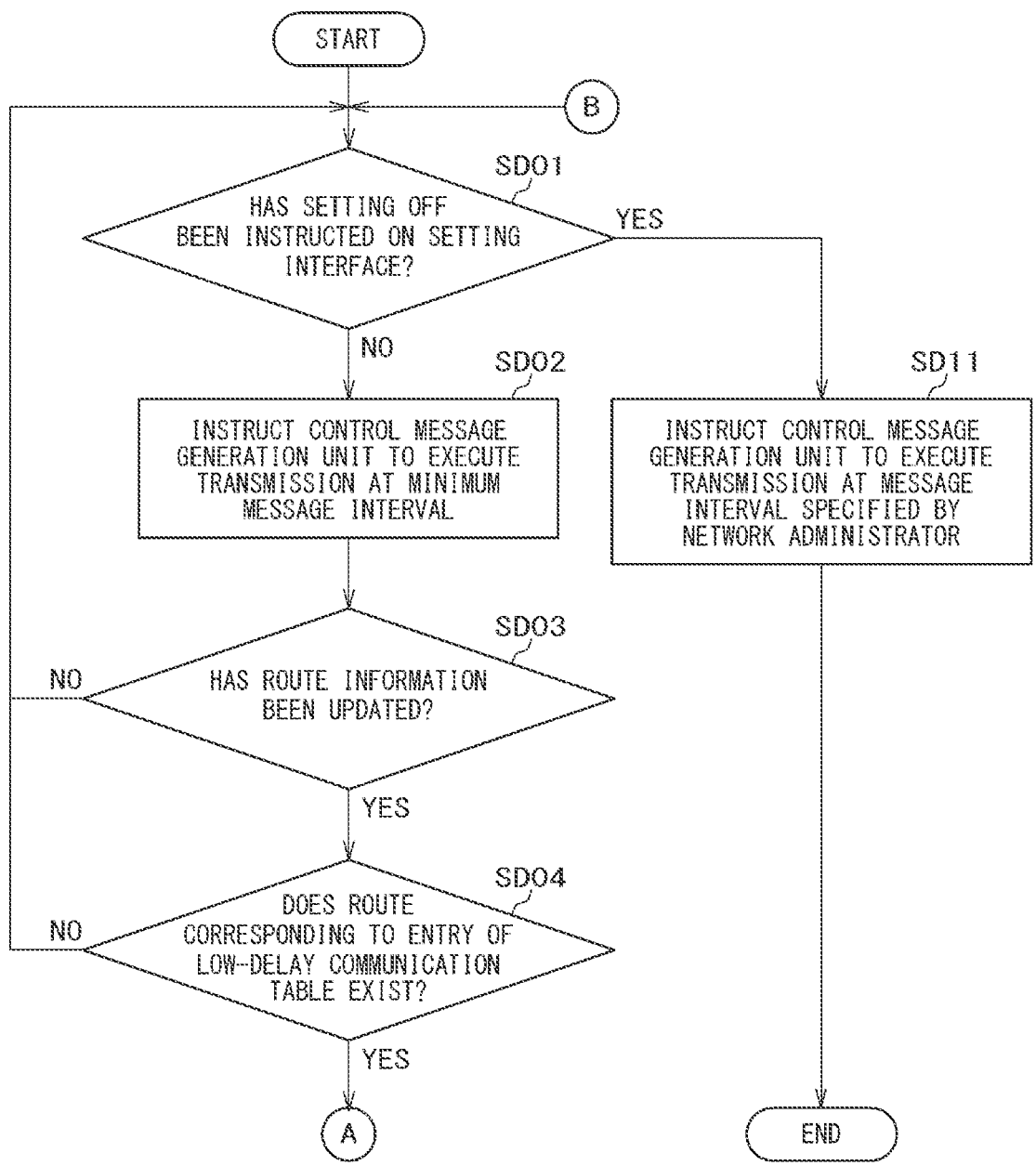
FIG. 13A is a flowchart describing a process to be executed by the communication device.
Figure 13B:
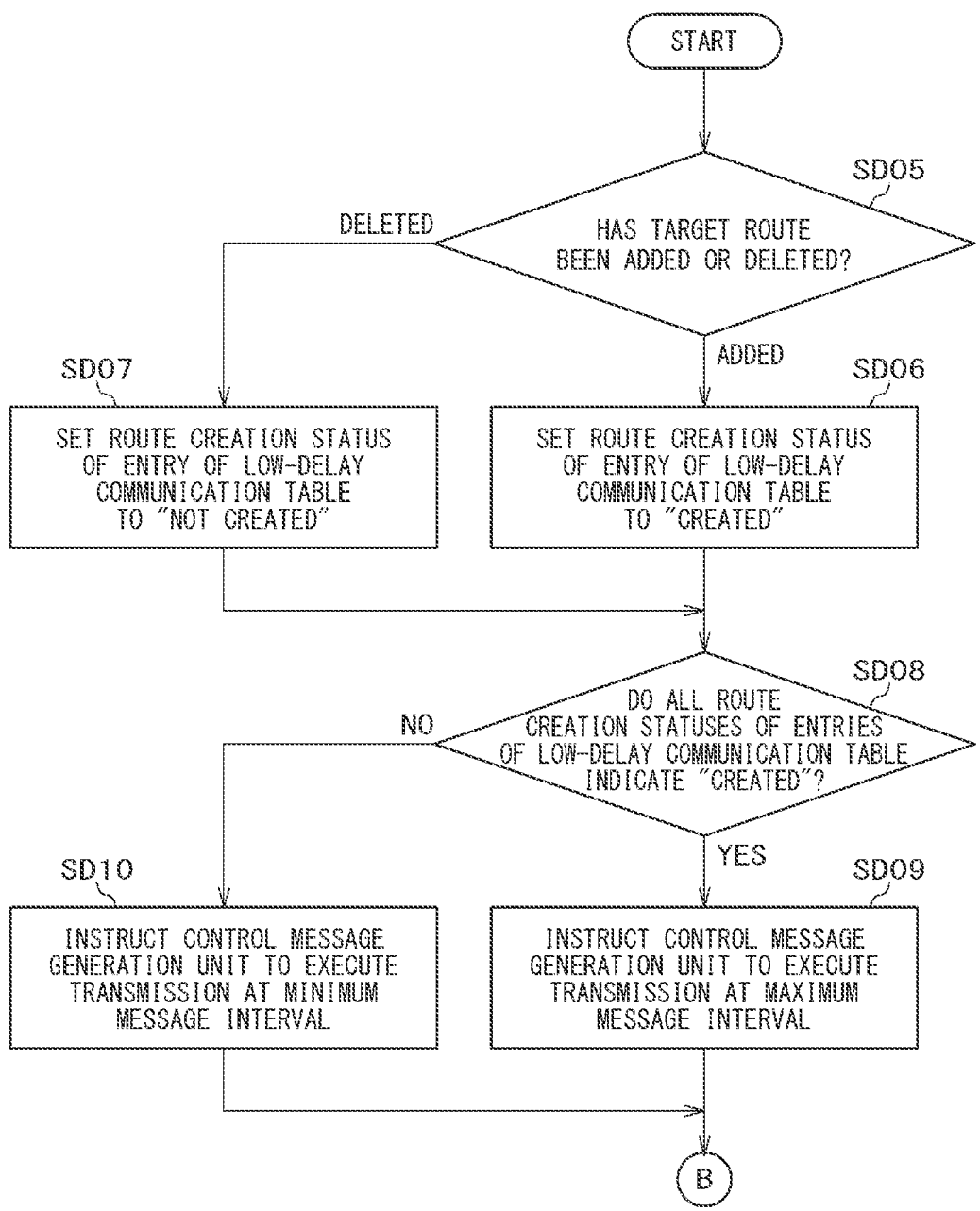
FIG. 13B is a flowchart describing the process to be executed by the communication device.

Next, operations to be executed when settings on the setting interface unit 912 are ON are described with reference to FIGS. 13A and 13B. FIGS. 13A and 13B are flowcharts of a process to be executed by the communication device.

The ad-hoc routing control unit 903 executes the following process when the settings on the setting interface unit shown in FIG. 11 are ON.

First, the ad-hoc routing control unit 903 instructs the control message generation unit A05 to generate a message at the minimum intervals. After that, similarly to the ad-hoc routing control unit A02 of the communication device A00 according to the comparative example, the ad-hoc routing control unit 903 references the low-delay communication table 904 during the creation or deletion of a route and updates a route creation status when an IP address or network address corresponding to an index (INDEX) value of the table exists in deleted route information. After the update, when all route creation statuses of entries registered in the low-delay communication table 904 indicate "created", the ad-hoc routing control unit 903 instructs the control message generation unit A05 to generate a control message at the maximum intervals. When one or more of the entries indicate "not created", the ad-hoc routing control unit 903 instructs the control message generation unit A05 to generate a control message at the minimum intervals.

More specifically, as shown in FIGS. 13A and 13B, the communication device executes the following process.

In step SD01, the ad-hoc routing control unit 903 determines whether setting OFF is instructed on the setting interface. When the answer is NO, the process proceeds to step SD02. When the answer is YES, the process proceeds to step SD11.

In step SD02, the ad-hoc routing control unit 903 instructs the control message generation unit A05 to execute transmission at the minimum control message intervals.

In step SD03, the ad-hoc routing control unit 903 determines whether the route information has been updated. When the answer is YES, the process proceeds to step SD04. When the answer is NO, the process returns to step SD01.

In step SD04, the ad-hoc routing control unit 903 determines whether a route corresponding to an entry of the low-delay communication table exists. When the answer is YES, the process proceeds to step SD05. When the answer is NO, the process returns to step SD01.

In step SD05, the ad-hoc routing control unit 903 determines whether the target route has been added or deleted. When the target route has been added, the process proceeds to step SD06. When the target route has been deleted, the process proceeds to step SD07.

In step SD06, the ad-hoc routing control unit 903 sets a route creation status of the entry of the low-delay communication table to "created".

In step SD07, the ad-hoc routing control unit 903 sets the route creation status of the entry of the low-delay communication table to "not created".

In step SD08, the ad-hoc routing control unit 903 determines whether all route creation statuses of entries of the low-delay communication table indicate "created". When the answer is YES, the process proceeds to step SD09. When the answer is NO, the process proceeds to step SD10.

In step SD09, the ad-hoc routing control unit 903 instructs the control message generation unit A05 to execute transmission at the maximum message intervals, and the process returns to step SD01.

In step SD10, the ad-hoc routing control unit 903 instructs the control message generation unit A05 to execute transmission at the minimum message intervals, and the process returns to step SD01.

In step SD11, the ad-hoc routing control unit 903 instructs the control message generation unit A05 to execute transmission at message intervals specified by the network administrator.

The present invention made by the present inventors is described above based on the embodiment and Example. The present invention, however, is not limited to the aforementioned embodiment and the aforementioned Example and may be variously changed.

Although Example describes the ad-hoc network communication, Example is applicable to wireless mesh network communication.

REFERENCE SIGNS LIST

900 . . . Communication device
901 . . . Network module (NWM)
902 . . . Human interface controller (HIC)
903 . . . Ad-hoc routing control unit (CNTU)
904 . . . Low-delay communication table
912 . . . Setting/display interface (SDI)
A03 . . . Control message transmission unit (CMTU)
A04 . . . Control message reception unit (CMRU)
A05 . . . Control message generation unit (CMGU)
A06 . . . Routing information base (RIB)
A07 . . . Routing table
A17 . . . Storage region (routing table cache (RTC))
A08 . . . Wired autonomous network interface
A09 . . . Wireless autonomous network interface
A10 . . . Wired network MAC layer (Ethernet MAC)
A11 . . . Wireless network MAC layer (Wireless Network MAC)
A12 . . . Wired network PHY layer (Ethernet PHY)
A13 . . . Wireless network PHY layer (Wireless Network PHY)

The invention claimed is:

1. A communication device to be used for ad-hoc network communication or wireless mesh network communication composed of a plurality of communication devices and be used in a communication system for communicating with at least one of the plurality of communication devices, comprising:

a setting interface unit configured to set an IP address of a communication device corresponding to low-delay communication;

the communication device being configured to:

determine a route matching the IP address of the communication device and determine whether the low-delay communication is possible when a request for the low-delay communication is provided from the setting interface unit, set a control message transmission interval to the maximum interval when the low-delay communication is possible, and control frequencies of exchange and exchange intervals of route control information according to an ad-hoc routing protocol, control the frequencies of the exchange and the exchange intervals of the route control information until the communication devices becomes able to communicate with the at least one communication device so that the frequencies of the exchange are set to the lowest frequency and the exchange intervals are set to the minimum interval and set the control message transmission interval to the minimum interval when the low-delay communication is not possible.

2. The communication device according to claim 1,
wherein the communication device is further configured to store a route creation status and store, as an index, the IP address of the communication device that has been set by the setting interface unit in a low delay communication table.

3. The communication device according to claim 2,
wherein the communication device is configured to determine, based on the route creation status, whether the low-delay communication is possible.

4. The communication device according to claim 3,
wherein the communication device is configured to determine that the low-delay communication is possible when the route creation status indicates created, and determine that the low-delay communication is not possible when the route creation status indicates not created.

5. The communication device according to claim 1,
wherein the setting interface unit is configured to set the request for the low delay communication to ON or OFF.

6. The communication device according to claim 5,
wherein the communication device is configured to set a control message transmission interval specified by a network administrator when the setting interface unit sets the request for the low delay communication to OFF.

* * * * *